United States Patent [19]
Baumann

[11] 4,037,363
[45] July 26, 1977

[54] METHOD AND APPARATUS FOR INCREASING THE AVAILABLE VOLUME FOR A NUTRITIVE SOLUTION CONTAINED IN A HYDROPONIC RECEPTACLE

[75] Inventor: Gerhard Baumann, Bern, Switzerland

[73] Assignee: Interhydro A. G., Bern, Switzerland

[21] Appl. No.: 562,128

[22] Filed: Mar. 26, 1975

[30] Foreign Application Priority Data

Mar. 29, 1974 Switzerland .................... 4421/74

[51] Int. Cl.$^2$ ............................................. A01G 31/02
[52] U.S. Cl. ........................................... 47/59; 47/66
[58] Field of Search ................... 47/38, 38.1, 34, 1.2, 47/79, 59, 63, 66

[56] References Cited

U.S. PATENT DOCUMENTS

| | | | |
|---|---|---|---|
| 3,250,606 | 5/1966 | Murray | 47/1.2 UX |
| 3,323,253 | 6/1967 | Robins | 47/1.2 |
| 3,805,445 | 4/1974 | Baumann | 47/1.2 |

FOREIGN PATENT DOCUMENTS 397,318  2/1966  Switzerland ........................ 47/1.2

*Primary Examiner*—Robert E. Bagwill
*Attorney, Agent, or Firm*—Imirie, Smiley & Linn

[57] ABSTRACT

Method and apparatus which increases the available volume for a nutritive solution contained in a hydroponic receptacle.

Hollow shells are placed on the bottom of the receptacle reaching a level just above the maximum level of the nutritive solution, the hollow shells being then covered with a layer of substratum. The hollow shells are made of a material without capillarity for preventing the evaporation of the nutritive solution, the shells being, for instance, cylindrically shaped, thin-walled and having openings at each end thereof.

Due to the low rate of evaporation, several days or even weeks can go by before the refilling; it is possible to install hydroponic receptacles outdoors.

6 Claims, 7 Drawing Figures

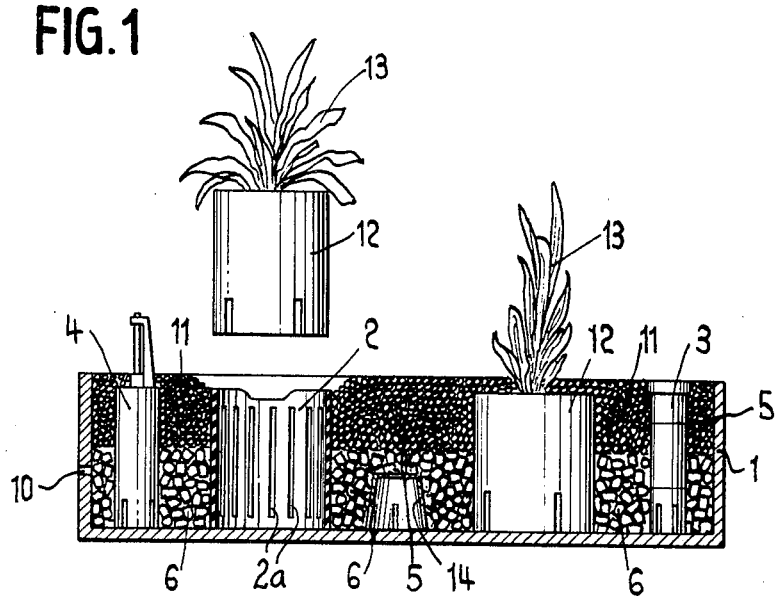
FIG.1
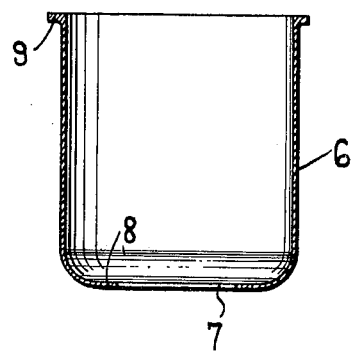
FIG.2
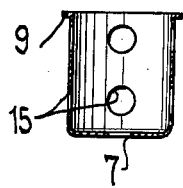   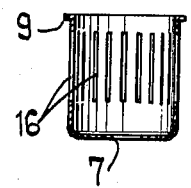   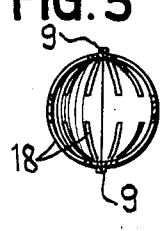   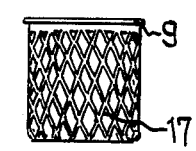
FIG.3    FIG.4    FIG.5    FIG.6

METHOD AND APPARATUS FOR INCREASING THE AVAILABLE VOLUME FOR A NUTRITIVE SOLUTION CONTAINED IN A HYDROPONIC RECEPTACLE

BACKGROUND OF THE INVENTION

The present invention relates generally to a process which increases the available volume for a nutritive solution contained in a hydroponic receptacle into which at least one plant and one substratum have been placed.

A system known as hydroponics is used for the maintenance of plants under interior conditions: individual plants are placed into pots which are placed in turn into a receptacle; the space surrounding each individual pot is entirely filled with a substratum made up of light expanded clay granules; a nutritive solution occupies the bottom of the receptacle; the volume of this nutritive solution is limited by the volume of clay granules which occupy a considerable part of the total volume.

In order to promote the growing of the plants, the amount of the nutritive solution, already limited by the volume of clay granules, must not drop below a certain level. It is, therefore, necessary to replenish the water or nutritive solution within relatively short time intervals. Furthermore, the capillarity of the substratum favors the evaporation of water on the surface of the granules.

It has been shown through experiments that, given the height of the receptacle, the kind of plants used and the capillary properties of the substratum, the loss in liquid due to evaporation is six to ten times the amount of liquid needed by the plants for growth.

Should the hydroponic receptacle be exposed to the open air, the loss in liquid due to evaporation is exceedingly severe.

Attempts were made to increase the available volume for the nutritive solution by placing flower pots upside down on the bottom of the receptacle. This prevented the substratum from penetrating into the interior of the flowerpots and increased thereby the available volume for the nutritive solution. This attempt was only a limited success, as it was very difficult to distribute the upside down flowerpots, there was only little reduction of evaporation and, finally, the gain in volume was relatively small.

A further attempt to increase the available volume for a nutritive solution involved the use of a different substratum, namely synthetic pins; again, the attempt was only a limited success, as a large quantity of synthetic material was necessary, little reduction of evaporation occurred and the gain in volume was small.

SUMMARY OF THE INVENTION

With these defects of the prior art in mind, it is a main object of the present invention to obtain inexpensive means of increasing the available volume for a nutritive solution while at the same time appreciably diminishing the evaporation rate of the same. The process according to the invention is characterized by the fact that hollow shells are placed on the bottom of the receptacle reaching a level just above the maximum of the level of the nutritive solution, these hollow shells being then covered with a layer of suitable material.

The shells are hollow, thin-walled and can easily be inserted into the receptacle; the proper volume of such a hollow shell is very small compared with the volume defined by its external surface. Furthermore, these hollow shells are made of synthetic materials and do not possess the surface properties conducive to the evaporation of water.

According to the invention an outstanding characteristic of these hollow shells is the fact that they are cylindrically shaped, thin-walled and have openings on both sides.

The relative position of these hollow shells placed loosely into the receptacle is unimportant; they are immersed in the nutritive solution and are practically filled; to empty them one needs only to empty the receptacle by suction avoding thereby the possibility that noxious deposits remain.

Additional objects and advantages of the present invention will become apparent upon consideration of the following description when taken in conjunction with the accompanying drawings.

BRIEF DESCRIPTION OF THE DRAWINGS

FIG. 1 is a vertical sectional view of a hydroponic system according to the present invention and embodying a process according to the present invention;

FIG. 2 is a vertical sectional view of a preferred embodiment of a hollow shell according to the present invention;

FIGS. 3, 4 and 5 are vertical sectional views of other embodiments of hollow shells according to the present invention;

FIG. 6 is an elevational view of yet another embodiment of a hollow shell according to the present invention.

DESCRIPTION OF THE PREFERRED EMBODIMENTS

Figure 7:
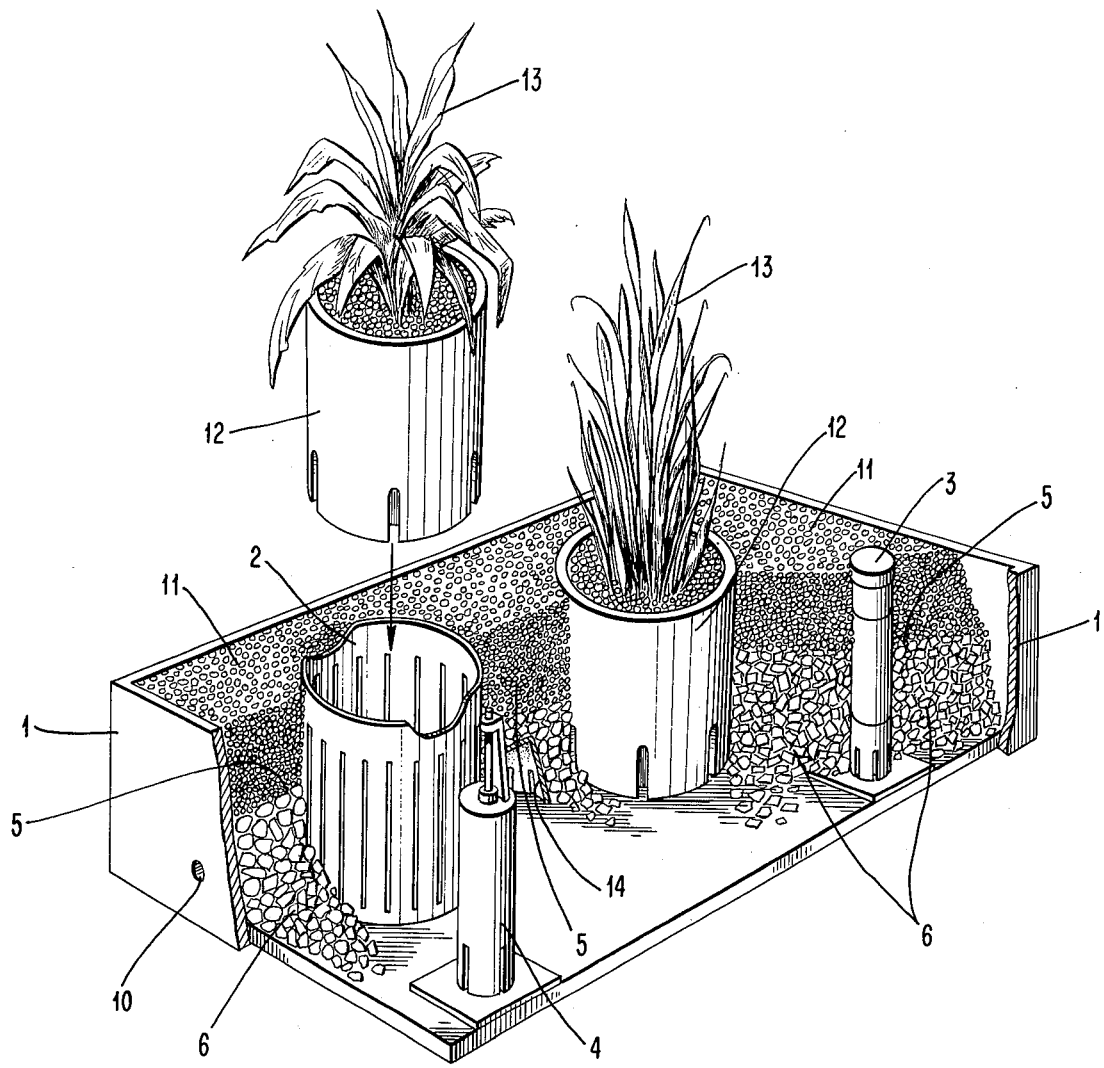
FIG. 7 is a perspective view, partially in section, of the system of FIG. 1.

The hydroponic system represented in FIGS. 1 and 7 comprises a watertight receptacle 1 into which plastic cylinders 2 with convenient openings 2a are placed, and a tube 3 for filling and emptying the receptacle as well as a liquid level indicator 4 are mounted. A suitable filling and emptying tube is shown in my U.S. Pat. No. 3,805,445, and a liquid level indicator which may be used in the present system is illustrated in my U.S. Pat. No. D238,860.

The bottom of the receptacle is filled up to level 5 with hollow shells 6. One of these shells is represented in FIG. 2. The hollow shell is made of synthetic, vacuum stretched material; it is cylindrically shaped and thinwalled. The hollow shell is provided with a bottom 8, a hole 7 in one end such that the bottom 8 constitutes an inwardly directed flange and a thin, outward directed flange 9 to improve upon the rigidity of the hollow shell on the other side. The wall of the hollow shell is between 0.2 and 0.5 mm thick and it is approximately 20 mm long and has a diameter of 15 to 20 mm.

The hollow shells reach level 5 which is above an outflow port 10 designed to channel any overflow. The hollow shells are covered by a conventional substratum 11, i.e., light expanded clay granules known as "LECA". The plants 13 already placed into pots 12 are installed into the cylinders 2 which facilitates the exchanging of plants as well as their turning to an advantageous position.

The assembly for a hydroponic system may be realized in the following way:

The cylinders 2, the pots 12, the tube 3 and the liquid level indicator 4 are installed. The receptacle is then filled with hollow shells 6 up to level 5 and the shells are then covered with substratum 11. Finally, the nutritive solution is poured into the tube 3. The solution should reach a level just below the outflow port 10.

Evaporation due to the capillarity of the substratum is at a minimum above the solution level, as the available volume for a nutritive solution is relatively large; several days or even weeks can go by before the refilling of the receptacle becomes necessary.

Experiments on evaporation rates, using a receptacle without plants and filled with a conventional substratum, showed that all of the water had evaporated after a period of four to five months; however, in a receptacle using the invention as discussed here under similar conditions, 25% of the water was left after one year.

The reduction in evaporation simplifies the maintenance of plants. It suffices to give the plants a specific concentration of the nutritive solution; adding water is no longer necessary. It should also be stated that the plants support a highly concentrated nutritive solution.

The greatly reduced weight of the hollow shells also reduces the total eight of the hydroponic receptacle.

The plants grow and open out when the level of nutritive solution is not too high. Due to a low evaporation rate and the large available volume, it is possible to choose a relatively low level for a given quantity of solution still maintaining a reasonable rate of refilling. Finally, it is possible to install hydroponic receptacles outdoors according to the particulars of the invention.

The layer of substratum can be much thinner than the one indicated in FIG. 1. It suffices to load the hollow shells just enough to keep them in place. Instead of light expanded clay granules "LECA", any aesthetically pleasing materials with the necessary technical properties can be used.

It is possible to reduce the volume of the entire unit of hollow shells by placing a casing 14 (see FIG. 1) on the bottom of the receptacle between the cylinder 2, the tube 3 and the level indicator 4.

The present invention also contemplates use of hollow shells with some holes 15 as shown in FIG. 3, with split walls 16 as shown in FIG. 4, or with a net or grate-like structure 17 as shown in FIG. 6. The shells can also be spherical with a split wall 18 as shown in FIG. 5.

Finally, other materials which avoid surface evaporation can be used for the production of hollow shells, i.e., ceramics or metals.

What I claim is:

1. A process which inreases the available volume for a nutritive solution contained in a hydroponic receptacle into which at least one plant and a substratum have been placed, comprising the steps of placing hollow shells on the bottom of the receptacle to a level just above the maximum level of the nutritive solution, and covering the hollow shells with a layer of material.

2. A process as defined in claim 1, wherein said material is substratum.

3. A process as defined in claim 1, wherein the volume of the entire unit of hollow shells is reduced by placing a casing on the bottom of the receptacle.

4. A system for increasing the available volume for a nutritive solution contained in a hydroponic receptacle into which at least one plant and a substratum have been placed, comprising a plurality of hollow shells placed on the bottom of the receptacle to a level just bove the maximum level of the nutritive solution, and a layer of material covering said hollow shells.

5. A system as defined in claim 4 wherein said hollow shells are cylindrically shaped, thin-walled and have openings at each end thereof.

6. A system as defined in claim 5 wherein said hollow shells have an inwardly directed flange at one end and an outwardly directed flange at the opposite end.

* * * * *